United States Patent [19]
Fountain

[11] Patent Number: 4,674,097
[45] Date of Patent: Jun. 16, 1987

[54] DISTRIBUTED-FEEDBACK DYE LASER

[75] Inventor: William D. Fountain, Fremont, Calif.

[73] Assignee: Cooper Lasersonics, Inc., Santa Clara, Calif.

[21] Appl. No.: 818,717

[22] Filed: Jan. 14, 1986

[51] Int. Cl.⁴ .............................................. H01S 3/20
[52] U.S. Cl. ...................................... 372/54; 372/96; 372/107
[58] Field of Search .................... 372/54, 96, 107, 108

[56] References Cited

U.S. PATENT DOCUMENTS

| | | | |
|---|---|---|---|
| 3,464,025 | 5/1964 | Bell | 331/94.5 |
| 3,675,157 | 7/1972 | Kaminow et al. | 372/96 |
| 4,187,475 | 2/1980 | Wieder | 372/54 |

OTHER PUBLICATIONS

Shank et al., entitled "Tunable Distributed-Feedback Dye Laser", *Applied Physics Letters*, vol. 18, No. 9, pp. 395, 396, 1 May 1971.

Bjorkholm and Shank, entitled "Higher-Order Distributed Feedback Oscillators", *Applied Physics Letters*, vol. 20, No. 8, 15 Apr. 1972, pp. 306-308.

Chandra et al., entitled "Prism-Dye Laser", *Applied Physics Letters*, vol. 21, No. 4, 15 Aug. 1972, pp. 144-146.

Bor et al., entitled "The Effect of an External Mirror on the Characteristics of an N₂ Laser-Pumped Distributed Feedback Dye Laser", *Optics Communications*, vol. 24, No. 3, Mar. 1978, pp. 265-267.

Bor, entitled "A Novel Pumping Arrangement for Tunable Single Picosecond Pulse Generation with a N₂ Laser Pumped Distributed Feedback Dye Laser", *Optics Communications*, vol. 29, No. 1, Apr. 1979, pp. 103-108.

Liu and Littman, entitled "Novel Geometry for Single-Mode Scanning of Tunable Lasers", *Optical Letters*, vol. 6, No. 3, Mar. 1981, pp. 117-118.

*Primary Examiner*—Leon Scott, Jr.
*Attorney, Agent, or Firm*—Cushman, Darby & Cushman

[57] ABSTRACT

A distributed-feedback dye laser having a tuning mirror for reflecting a pumping beam onto an impinging region of a dye cell. A four-link equilateral-parallelogram structure pivotally attached to the mirror is adjustable to translate the tuning mirror along the path of the pumping beam incident on the mirror while simultaneously changing the angular orientation of the mirror. The pumping beam reflected from the tuning mirror is directed toward a predetermined point for all positions of adjustment whereby the beam impinges generally the same region of the dye cell for a wide range of incident angles. The dye cell impinged by the pumping beam may also have a surface, through which the generated laser beam is transmitted, oblique to the laser beam and perpendicular to the dye cell region impinged by the pumping beam.

28 Claims, 6 Drawing Figures

DISTRIBUTED-FEEDBACK DYE LASER

BACKGROUND AND SUMMARY OF THE INVENTION

This invention pertains to distributed-feedback dye lasers, and in particular, to such lasers having adjustable mirrors for directing a pumping beam at a dye cell over a range of angles.

A distributed-feedback dye laser (DFDL) provides a narrow line width, coherent light source in which the refractive-index and gain modulations are induced by an interference pattern produced when a pair of pumping beams impinge a dye cell region from generally opposed, angled directions. The feedback required for laser operation results from Bragg scattering from the spatially periodic laser medium susceptibility induced by the interference of the two coherent pump beams. Typical DFDL systems are shown in an article entitled "Prism-Dye Laser" by Chandra, et al., *Appl. Phys. Lett.*, Vol. 21, No. 4, Aug. 15, 1972, pp. 144–146, and in an article entitled "A Novel Pumping Arrangement for Tunable Single Picosecond Pulse Generation with a N₂ Laser Pumped Distributed Feedback Dye Laser" by Bor, *Optics Communications*, Volume 29, No. 1, April 1979, pp. 103–108. Such systems normally have an index-of-refraction-matching prism disposed on the dye cell to facilitate directing the pumping beam into the dye cell. In such systems the dye laser wavelength is given by $$\lambda_L = (n_s \lambda_p)/(n_p \sin \theta)$$

where $\lambda_p$ is the pumping wavelength, $n_s$ and $n_p$ are, respectively, the refractive indices of the dye solution at $\lambda_L$ and the prism at $\lambda_p$, and the angle $\theta$ is the angle of incidence at the prism-dye interface. The wavelength is thus inversely proportional to the angle of incidence.

In such systems it is typical to either split a pumping beam and reflect it from a pair of tuning mirrors to the dye cell or to use a prism on the dye cell having a highly reflective face normal to the face of the dye cell with half of the impinging pumping beam being reflected from the face onto the other half of the beam which impinges the dye cell. Such systems are tuned by varying the angle of incidence of the pumping beam on the prism or, if there is no prism, on the dye cell. The resulting laser wavelength varies approximately 8 nm per degree of change of angle of incidence.

Heretofore, adjustment of the angle of incidence on the dye cell has included translating a tuning mirror along the path of the pumping beam incident on the mirror or rotating the mirror in place. Alternatively, the prism/dye-cell assembly is rotated. Such adjustment methods have very limited ranges of angle adjustment because the resulting two incident pumping beams only overlap completely at a single orientation of the mirror(s) relative to the dye cell. Small angular variation of either the dye cell or the tuning mirror shifts the incident pumping beams. Also, rotation of the dye cell causes a corresponding rotation of the output laser beam. For example, assume the length of the "footprint" of a beam impinging on a dye cell at an angle of 45° from a mirror 10 cm away, is 1.60 cm in length. If the mirror is rotated in place one degree, the footprint shifts 0.12 cm. Thus, the amount of overlap is reduced to approximately 1.36 cm, or 85% of the original overlapped length. An angle shift of approximately 6° results in no overlap at all. If the tuning mirror is simply translated along the path of the beam incident on the mirror, the reflected beam which is incident on the dye cell is moved correspondingly. Thus, there would be very little movement allowed of the tuning mirror (approximately 0.6 cm in the example above) before, again, there is no overlap between the two impinging pumping beams. It can be seen that such systems are extremely sensitive to movement of the tuning mirror.

Conventional DFDLs are also inefficient in the construction of the dye cell container relative to a laser beam generated in the dye cell. In particular, laser exit surfaces are constructed in planes disposed either perpendicular to the laser beam direction, or more commonly, at an angle oblique to the laser beam but which intersect a plane, parallel with the impinged region of the dye solution and containing the center line or axis of the laser beam, to define a line perpendicular to the laser beam. Although the oblique angle of such a surface relative to the laser beam reduces unwanted reflection back into the dye cell, it does not completely prevent it.

The present invention overcomes the noted disadvantages of conventional DFDLs. The invention includes means for adjusting the position of the tuning mirror along the incident pumping beam path such that the mirror directs the resulting reflected beam toward the dye cell region in a manner impinging substantially the same portion of the region for the positions of adjustment of the mirror along the path. This preferably includes changing the angular orientation of the mirror simultaneously with translation of the mirror along the incident beam path. The preferred embodiment includes an adjustable equilateral-parallelogram configuration of links controllably pivotally coupled to the tuning mirror. In addition, means are provided for varying the direction of the pumping beam prior to reflection by the tuning mirror and thereby, for varying the direction of the beam reflected by the tuning mirror.

As another salient feature of the present invention, the dye cell surfaces through which the generated lasing beam passes are preferably oriented relative to the lasing beam at an oblique angle relative to the laser beam and perpendicularly relative to a plane both containing the laser beam and extending generally parallel with the dye cell surface which is impinged by the pumping beams.

These and additional features and advantages of the present invention will be more clearly understood from a consideration of the drawings and the following detailed description of the preferred embodiment.

BRIEF DESCRIPTION OF THE DRAWINGS

With reference to the accompanying six sheets of drawings.

DETAILED DESCRIPTION OF THE PREFERRED EMBODIMENT

Figure 4:
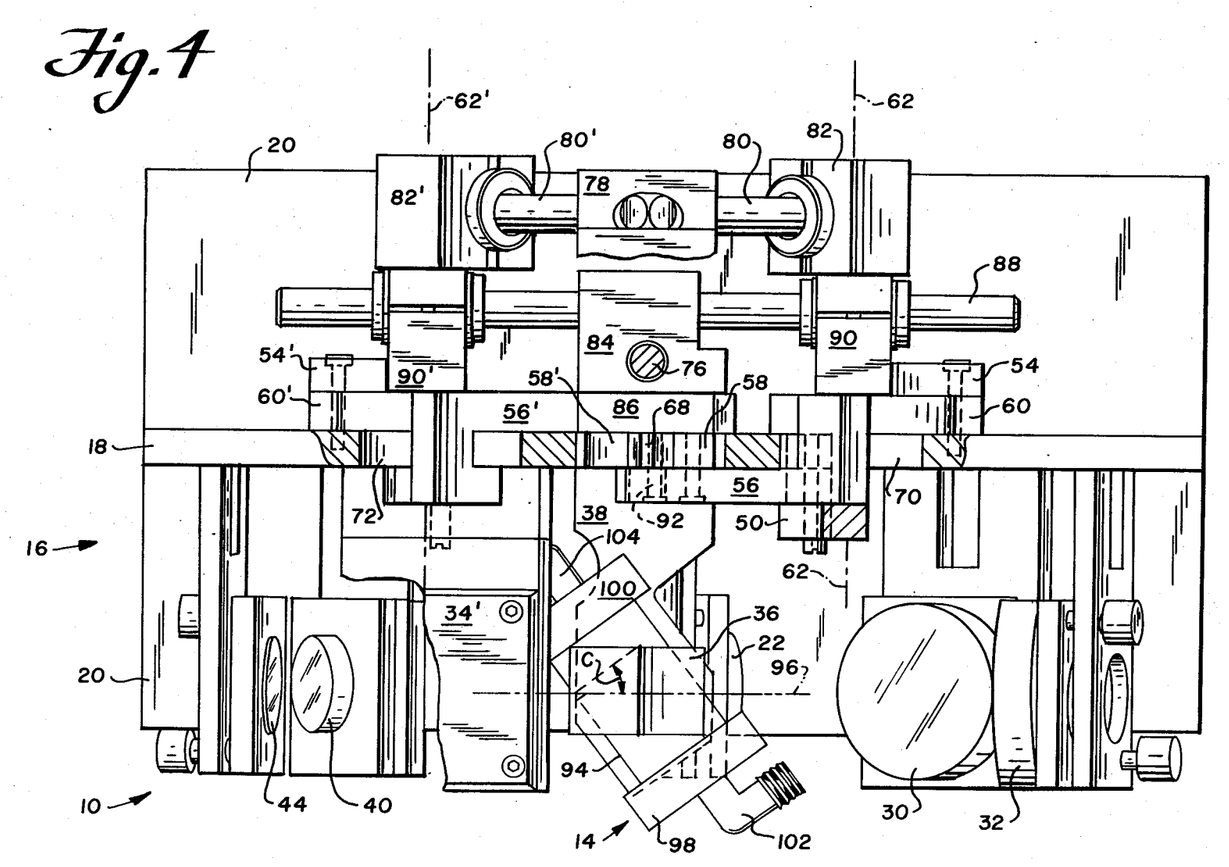
FIG. 4 is a top view of the laser of FIG. 1 without the turn crank, with the right tuning mirror sectioned off, and with the left tuning mirror cut away.
Figure 5:
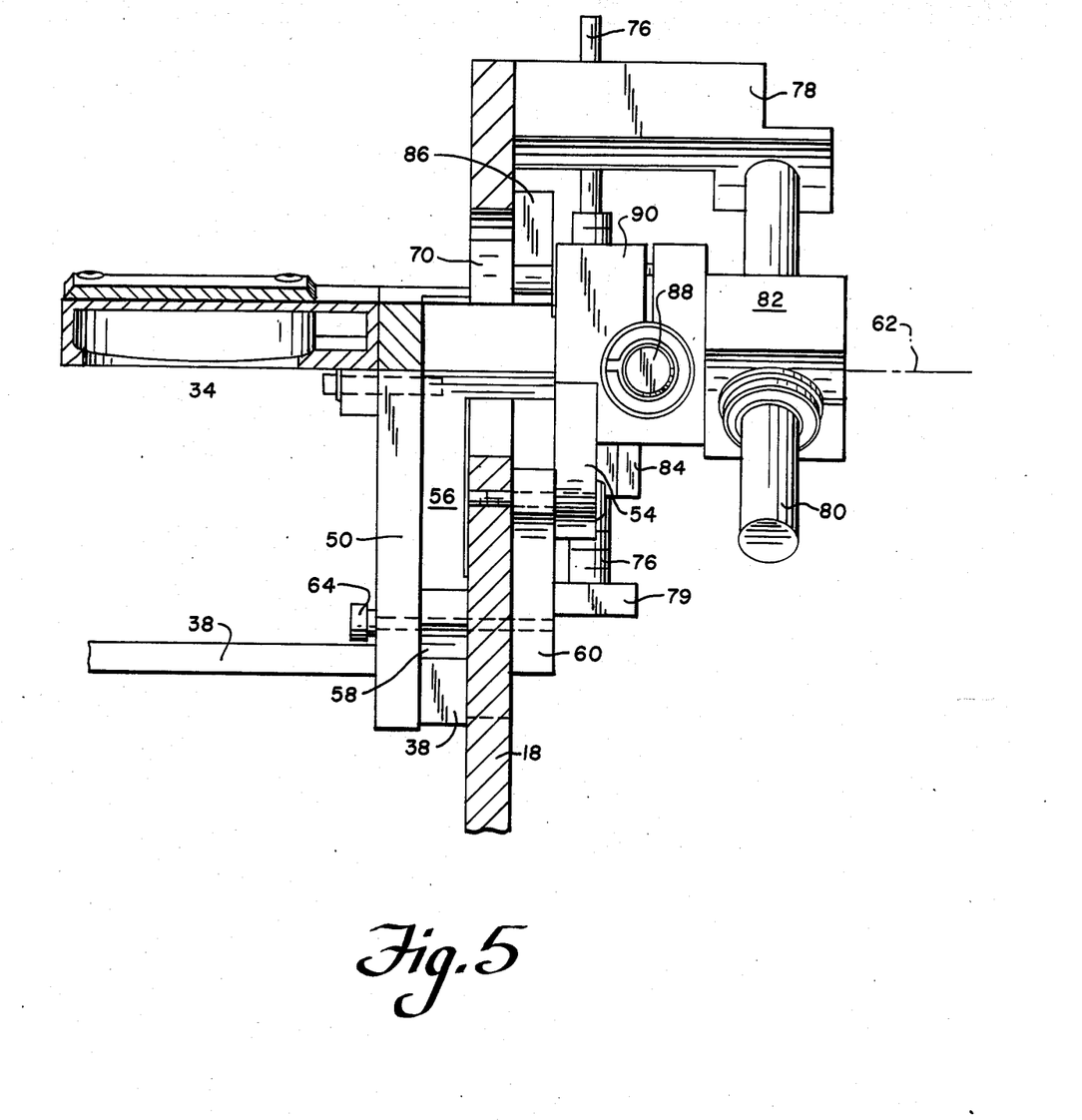
FIG. 5 is a simplified cross-sectional view taken along line 5—5 of FIG. 3 also with the turn crank omitted and with the right tuning mirror as the only mirror included.
Figure 6:
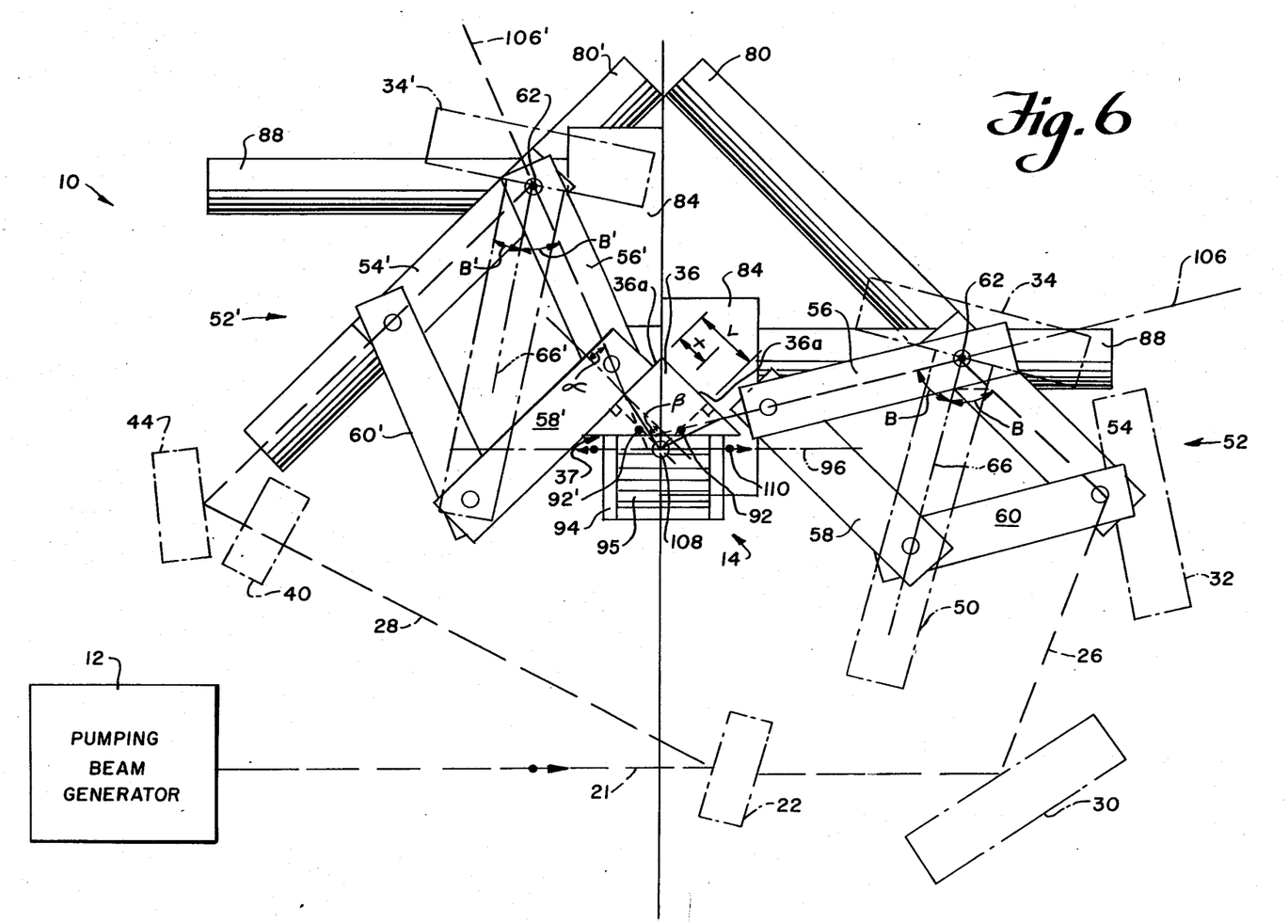
FIG. 6 is a simplified schematic similar to FIG. 3 but illustrating the relative positions of the linkage-assembly-controlled mirrors, the refractive-index-matching prism and the dye cell.

Referring initially to FIGS. 1-5 shown generally at 10 is a distributed-feedback dye laser, except for a pumping-beam generator 12 shown in block form in FIG. 6. In each of FIGS. 1-5, generator 12 has been omitted for purposes of clarity. It will, however, be understood that generator 12 provides the focused pumping beam which is to be controlled within laser 10 as will be desribed. Dye laser 10 also includes a dye cell 14 and a pumping-beam controller, shown generally at 16. Dye cell 14 and controller 16 are mounted on a vertical mounting panel 18 which is supported by a horizontal base 20, as shown.

Figure 1:
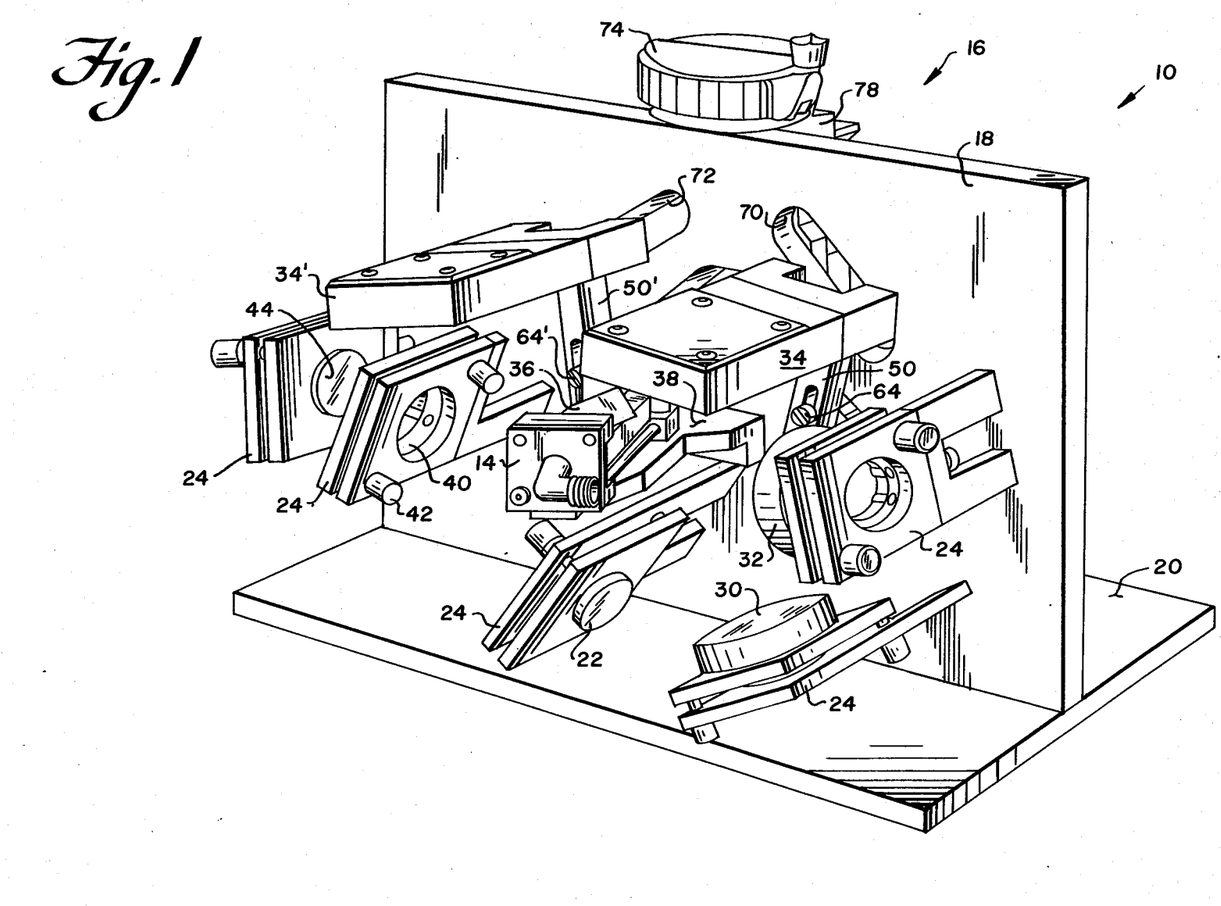
FIG. 1 is a perspective view of the front of a distributed-feedback dye laser made according to the present invention.
Figure 2:
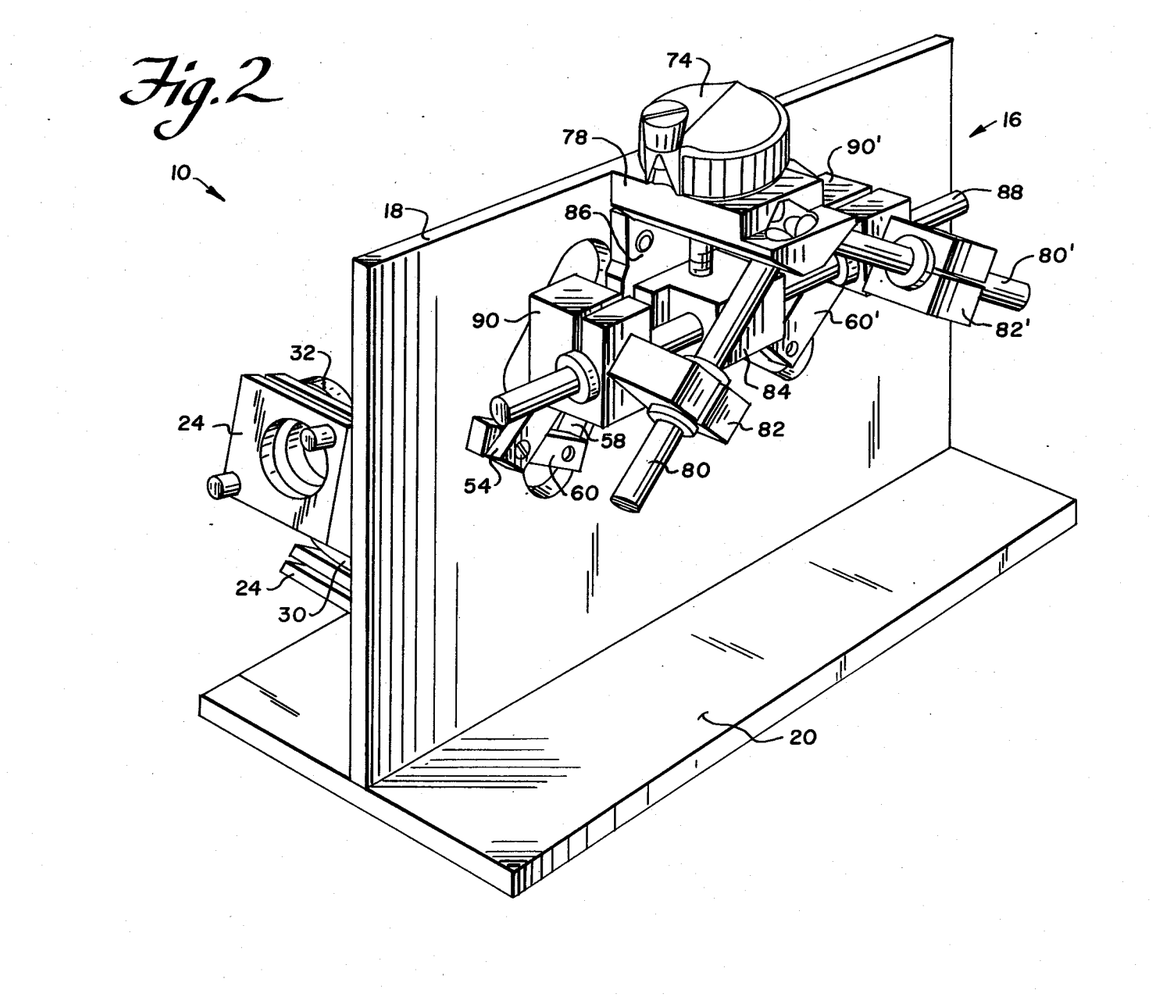
FIG. 2 is a perspective view of the rear of the laser of FIG. 1.
Figure 3:
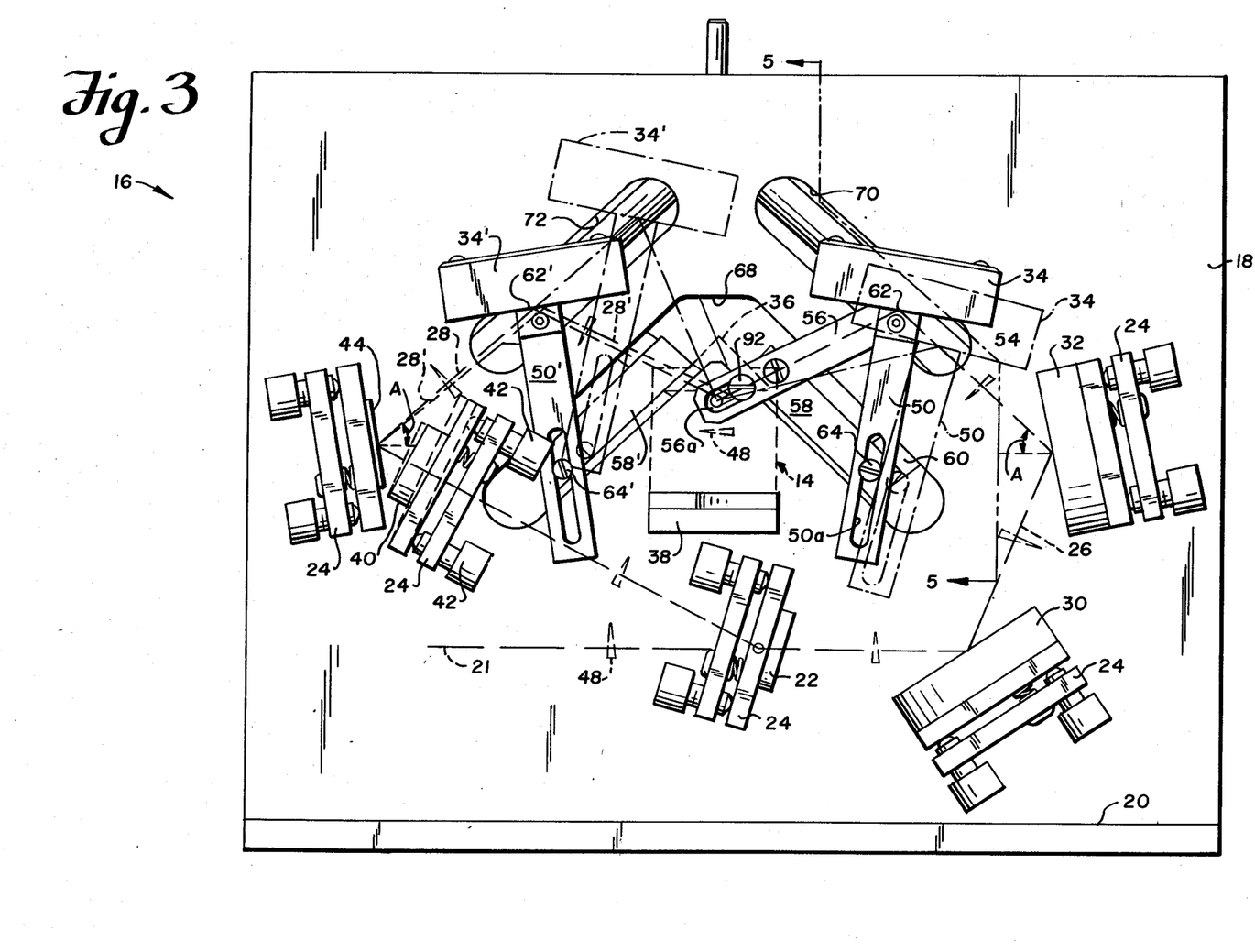
FIG. 3 is a simplified front elevation view of the laser of FIG. 1 illustrating the optical paths defined by it.

Mounted on the rear of panel 18 is an assembly of components, particularly shown in FIG. 2, which provides for adjustment of the optical system mounted on the front of the mounting panel, as particularly shown in FIGS. 1, 3. The optical system will be described initially. The adjusting mechanism will then be described to show how the optical system is controlled.

Referring now particularly to FIGS. 1 and 3, a pumping beam 21 produced by generator 12 impinges from the left a 50/50 beam splitter 22, also referred to as beam-splitting means. Beam 21 is preferably polarized perpendicular to the plane of FIG. 6 as indicated by the dot and arrow associated with the beam output from generator 12. Beam splitter 22 is mounted on a commercially available adjustable mounting assembly 24 which is fixedly anchored to panel 18. Similar adjustable mounting assemblies are shown with respect to other optical devices contained in controller 16. Those that are fixed in position, such as the beam splitter, could also be fixedly mounted to a mounting plate. Incoming pumping beam 21 is divided by splitter 22 into a transmitted split beam, travelling along a path defined by a split beam axis shown in dashed lines at 26, and an equal reflected split beam, traveling along a corresponding path defined by a split beam axis shown at 28. Beams 21, 26 and 28 are coplanar. For purposes of clarity, the terms split beam, split beam path and split beam axis will be referred to by the corresponding axis numbers 26 and 28 just identified. It will be understood that the beam is the actual radiation which encompasses a cross-sectional area defined by the characteristics of the generated pumping beam and associated focusing optical devices included in generator 12.

Transmitted split beam 26 impinges a fixed reflecting mirror 30 mounted on a mounting assembly 24 which is attached to panel 18. The beam is then reflected to a second fixed mirror 32, also mounted on an assembly 24, which mirror in turn reflects the beam to a first tuning mirror 34. Mirror 34 provides means for reflecting an incident beam toward the dye cell. Specifically, it reflects a split beam toward a 45° equilateral refractive-index-matching prism 36 disposed (with a layer of index-matching liquid 37 shown generally in FIG. 6) on dye cell 14. The dye cell and prism are only shown in outline form on FIG. 3 so that the structure associated with the tuning mirrors may be more clearly illustrated. The mounting of tuning mirror 34 will be described in more detail shortly. Dye cell 14 is mounted on a horizontally-disposed mounting plate 38 fixedly joined to panel 18.

Reflected split beam 28 passes through a fine tuning prism 40 mounted for adjustable positioning on a mounting assembly 24. Prism 40 is a solid prism made of fused silica or other suitable transparent material. It includes a pair of opposing faces which beam 28 passes through and which are disposed at a 1° angle relative to each other. As will be described further, mounting assembly 24 includes a pair of manually adjustable screws 42 which provide means for changing the angular orientation of prism 40 by rotating the prism about an axis normal to the plane of beam 28.

After passing through prism 40, beam 28 is reflected from a fixed mirror 44 to a second tuning mirror 34' which, like tuning mirror 34, reflects the split beam through prism 36 to dye cell 14.

The two tuning mirrors and the structure for adjusting them are effectively mirror images of each other, except for a few items which are associated with both mirrors. Thus, to facilitate the description, numbers will be used to refer to the structure associated with the tuning mirror controls on the right side of FIG. 3, and the same numbers with a prime will be used to refer to the equivalent structure on the left side.

The angles of mirrors 22, 30, 32 and 44 are disposed so that the corresponding beams are reflected from mirrors 32, 44 upwardly from the horizontal and inwardly at an angle "A" equal to 45°, as shown in FIG. 3. Further, the distance from beam splitter 22 to dye cell 14 along path 28 is equal to the distance from the beam splitter to the dye cell along path 26. The phases of the beams generally vary with distance. By having equal length paths, they tend to change phase consistently so that they are in a constant phase relationship at the dye cell interface.

It will also be appreciated, as will be discussed further, the two split beams have an equal number of reflections. That is, beam 26 is reflected by mirrors 30, 32, and 34, whereas beam 28 is reflected by beam splitter 22, mirror 44, and mirror 34'. To illustrate the reason for having a number of reflections which is even or odd for both split beams, a narrow dashed triangle 48 is shown at various places along the beam paths to show the orientation of the beams as they progress along the two paths. A pumping beam 21 may be stronger on one side than the other, be of different geometry, or otherwise vary across its cross section. Following orientation triangles 48 along the two paths, it can be seen that, by having an equal number of reflections or at least a number of reflections in the two split beam paths which differs by an even number, both beams overlap on dye cell 14 with the same orientation. Also when the number of reflections is equal, a small change in direction of pump beam 21—due, for example, to vibration of generator 12 with respect to dye laser 10—results in no change in the angle at prism 36 between split beams 26 and 28 and hence no change in the wavelength of yet-to-be-described output beam 110 of the dye laser.

By adjusting fine tuning prism 40, such as to the exaggerated position shown in dashed outline in FIG. 3, the direction of beam 28 can be diverted from the path it would otherwise follow. Extremely small adjustments in pump beam direction and hence output beam wavelength are possible with adjustment of prism 40. A diverted beam is shown as dashed line 28' at an exaggerated angle to illustrate the effect of prism 40 on beam 28.

Means are provided for adjusting the position of mirrors 34, 34' along the incident split pumping beam paths 26, 28. More specifically and as now will be described, means are included for changing the angular orientation of the tuning mirrors as they are translated along the path of pumping beams incident on them. As mentioned previously, the structure provided for adjusting each mirror is essentially the same. Therefore, the following description is generally limited to the structure associated with tuning mirror 34. It will be understood that equivalent structure also exists for mirror 34'. Mirror 34 is fixedly mounted to a guide link 50 which extends downwardly from the mirror and normally to its face. In the lower end of link 50 is a longitudinally extending slot 50a. Connected to link 50 is a four-link, equilateral-parallelogram assembly, shown generally at 52 in FIG. 6. The four-link assembly includes links 54, 56, 58, 60 (also referred to as first, second, third and fourth links, respectively) pivotally connected at their ends. Link 54 is parallel to the path of a beam 26 incident on mirror 34. Guide 50 and mirror 34 are pivotally connected to links 54, 56 at the junction between the two links such that the face of mirror 34 is coincident with the axis of pivoting between links 54, 56, shown as axis 62. Axis 62 intersects the point of incidence of split beam path 26 on mirror 34. Disposed in slot 50a is a pin 64 which is disposed coincident with the axis of pivoting between links 58, 60. Pin 64 is intersected by a line extending normal to mirror face 34 and through pivot axis 62, which line is shown as dashed double dot line 66 in FIG. 6. It can be seen that line 66 bisects the angle formed by the portions of split beam 26 incident on and reflected from mirror 34. These bisected angles, shown as angles "B" in FIG. 6, are always equal for any position of assembly 52 since the four links are of equal lengths. This is further illustrated in FIG. 6 in association with four-link assembly shown as 52'. Mirror 34' is shown in a raised position, with the two equivalent angles B' formed by the incident and reflected split beams and bisecting line 66' associated with link 50'.

It should be clear that FIG. 6 is a split-image figure which illustrates on the left and right sides of the figure, two opposite extreme positions that the tuning mirrors can take. The two positions thus represent the range of positions that the tuning mirrors can take. They do not illustrate two positions that may exist simultaneously. That is, when mirror 34 is in the position shown in FIG. 6, mirror 34' is also in the same position. Correspondingly, when mirror 34' is in the raised position shown in the figure, mirror 34 is in the same position next to it.

The description of the adjusting mechanism for tuning mirrors 34, 34' will now be explained. It can be seen that mounting panel 18 contains an upside-down V-shaped aperture 68 and a pair of elongate apertures 70, 72, each parallel to one leg of aperture 68, as shown. These apertures provide for connection between the links forming the adjusting mechanism and the tuning mirrors. Links 50, 50', 56 are disposed on the mirror side of mounting panel 18. Link 58 is disposed within the corresponding leg of V-shaped aperture 68. The other links are behind the panel.

Referring now particularly to FIGS. 2, 4, 5, a crank 74 is disposed near the top of panel 18 and is fixedly connected to a threaded adjustment rod 76, both of which are mounted for rotation to a platform 78 attached to panel 18. The lower end of rod 76 is supported on a bearing plate 79 attached to and extending rearwardly from panel 18. Fixedly attached to the outer or distal end of platform 78 is a pair of downwardly obliquely extending guide rods 80, 80' disposed at 45° angles from horizontal. Rod 80 is supported at an upper end in platform 78 and extends downwardly away from the platform at an angle of 45° so that it is parallel with link 54. Disposed on each of rods 80, 80' is a linear bearing 82, 82', respectively, which is slidable longitudinally along the respective guide rods.

Adjustment rod 76 is matingly received in a threaded bore extending vertically through an adjustment block 84. Block 84 has a face extending generally parallel with a mounting plate 86 used to support platform 78. The block face is parallel with the vertical rear face of panel 18, as shown. The adjacent faces of block 84 and plate 86 maintain the orientation of the block as it is moved vertically by adjustment of rod 76. Fixedly attached to block 84 is a horizontal guide rod 88 which extends away from the block in lateral directions generally parallel with the rear face of panel 18. Rod 88 also has disposed on it a pair of linear bearings 90, 90'. Bearings 82, 90 (and bearings 82', 90') are pivotally joined for rotation about an axis which intersects the longitudinal axis of each of rods 88 and 80 (and rods 88 and 80'). That is, bearing 82 pivots relative to bearing 90 about an axis which extends horizontally perpendicularly to both rod 88 and rod 80. It can be seen that as block 84 is moved vertically, bearings 82, 82' are also caused to move the same distance vertically. However, because they are disposed on oblique rods 80, 80', respectively, they also move horizontally. This resulting horizontal movement causes bearings 90 and 90' to move horizontally on rod 88.

Bearings 82, 90 are disposed to rotate about horizontal axis 62. It will be noted that axis 62 is the pivot axis of rotation of mirror face 34 relative to links 54, 56, described previously. Link 58 is disposed within the right leg of aperture 68. As particularly seen in FIG. 3, link 56 extends in the direction of dye cell 14 beyond its pivot connection with link 58 to a distal end having a longitudinally extending opening 56a. Disposed for sliding receipt in opening 56a is a pin 92 fixedly joined to mounting panel 18. Link 56 rotates about pin 92 as mirror 34 is adjusted along rod 80. As can be seen with reference to FIG. 4, link 56' extends through aperture 72 and down along the rear face of mounting panel 18 to another pin similar to pin 92 joined to the rear of the mounting plate and extending into an elongate opening in link 56'.

The relative orientation of dye cell 14 and refractive-index-matching prism 36 can be seen particularly with reference to FIG. 4. Prism 36 is disposed on the top of a dye cell container 94 which is made of fused silica, the same as prism 36. Between prism 36 and container 94 lies a film 37 (shown generally in FIG. 6) of index-matching liquid (alternately, prism 36 could be optically contacted to container 94) to eliminate the reflection that would otherwise exist at the interface of prism 36 with the air film that would otherwise lie between prism 36 and container 94. Container 94 includes an internal chamber through which a suitable dye solution 95 is pumped during a lasing operation. Such a solution may be Rhodamine 6G in ethanol which has an index of refraction of approximately 1.36. Other solutions are also known which may be used. The fused silica has an index of refraction of approximately 1.46. These indices of refraction are sufficiently close to produce very little reflection of a beam passing through the interface between them. The split beams reflected from the two tuning mirrors impinge opposite faces 36a, 36a' of prism 36 in a common plane which is perpendicular to a planar interface between prism 36 and dye cell container 94. Axis 96 represents the axis of laser beams produced in dye cell container 94. Angle "C", shown in FIG. 4, is the incident angle of a laser beam on the interface between the outer surface of container 94 and air. This angle is set equal to Brewster's angle which, in the preferred embodiment, is approximately 33 degrees. The reason for this will be discussed shortly. Dye cell 14 also includes a pair of end caps 98, 100 which have a pair of connections 102, 104, respectively, to a conventional dye cell pumping system.

Referring now to FIG. 6, a simplified schematic is shown which illustrates the operation and geometrical orientation of controller 16, dye cell 14 and pumping beam generator 12 of distributed-feedback dye laser 10. Again, it should be noted that FIG. 6 is divided vertically into two portions. The right portion represents the position of the tuning mirrors at the lowest position, whereas the left half of the figure illustrates the position of the tuning mirrors in their highest position. At any given adjustment setting, both tuning mirrors will have the same vertical position since they are in fact pivotally connected about axes extending through horizontal rod 88.

Link 56 is disposed along what may be considered an axis 106 of a split beam reflected from mirror 34. This axis intersects the axial extension of pivot pin 92 (this intersection will be referred to as point 92) the position of which is shown as a large dot on axis 106. As link assembly 52 is adjusted in position, link 54 moves parallel to rod 80 and link 56 pivots about pin 92. Because of the difference of indices of refraction between air and prism 36 a beam reflected from mirror 34 does not pass directly through point 92. Rather, it is refracted toward a target point 108 disposed on the interface between dye 95 and container 94. The portion of this interface impinged by the pumping beams is also referred to as a dye cell impinging region. In the preferred embodiment, the base of prism 36 is approximately 2.5 cm long. Let 3 represent the angle of incidence of a beam impinging face 36a of prism 36 and $\beta$ the angle of refraction of the beam. Also let L represent the distance between target point 108 and impinged face 36a, which distance is measured along a straight line extending through target point 108 and perpendicular to the prism face. Also let $n_m$ and $n_p$ represent the refractive-index of the medium through which the impinging beam passes (air in this case) and the refractive-index of prism 36, respectively. Then, x represents the distance from the corresponding face 36a of prism 36 to the location of point 92 (and therefore, pin 92). The length x is determined by the equation $x=(n_m L \cos \alpha)/(n_p \cos \beta)$. In the preferred embodiment of the present invention, link 56 can vary between an orientation of approximately 15° from horizontal to a position of approximately 65° from horizontal. This equates to angles of incidence on prism face 36a of 30° and 20°, respectively. For any particuar application, the expected median angle of incidence would be chosen for determining the position of point 92. As an example, if the median angle is zero degrees (the normal to prism face 36a) then this equation reduces to $x=L/n_p$, where the prism is placed in air. In this case n = approximately 1.46 and point 92 is disposed approximately 68 percent of the distance of length L from face 36a. If the base of prism 36, existing at the interface between container 94 and dye 95, is 2.5 cm, then L=approximately 0.88 cm and x=0.61 cm. Therefore, the distance from target point 108 to point 92 is the difference between these values, or 0.27 cm.

Generator 12 focuses a beam so that, when it impinges the dye cell impinging region, it has a high length to width, or aspect ratio. A representative footprint of a beam on the dye interface could have the dimensions of 1.6 cm long by 0.3 mm wide. As the angle of incidence of a beam striking prism face 36a varies from the median angle, the axis of the beam will not intersect target 108 precisely. However, there will be only minor variation from it. As an example, for the prism described and an angle of incidence of approximately 25 degrees away from the median angle, the footprint of each beam impinging the dye interface will have shifted along the length of the footprint by approximately 0.05 cm. With each impinging beam shifting in opposite directions this equates to a relative shift between the two beam footprints of approximately 0.1 cm. There is thus still a 93 percent overlap of the two impinging beams for a 25 degree adjustment of a beam reflected from the tuning mirror. There is thus very little variation of the area of overlap of the two beams over the range of adjustment of the tuning mirrors. In a distributed-feedback dye laser which does not include a refractive-index-matching prism on the dye cell, pivot point 92 and target point 108 are coincident. In this case, the two impinging beams have full overlap for all angles of adjustment.

A laser beam produced in dye 95 propagates along axis 96 as described previously. Such a laser beam, identified by arrow 110 in FIG. 6, is polarized in a direction parallel with the interface between container 94 and dye 95, which direction is also perpendicular to the plane of impinging pumping-beams. This polarity is represented by the dot on arrow 110 which, as is conventional in the art, represents polarization in a plane perpendicular to the view of FIG. 6 containing axis 96. By orienting the faces of container 94 through which the laser beam is transmitted at Brewster's angle as shown in FIG. 4, the entire laser beam is transmitted out of container 94 and does not reflect internally at all. Any reflection that could occur at Brewster's angle would have to have a polarization normal to the actual polarization of the laser beam. Therefore, the beam is fully transmitted. This reduces spurious lasing generated by any reflected beam and assures that there are no Fresnel losses and no undesirable feedback from the external interfaces of dye cell 14.

Although not shown, it is understood that mirrors disposed along laser axis 96 are needed to direct the output beams away from the apparatus of dye laser 10. These mirrors would be installed to direct the beams in directions suitable for the desired application.

It will thus be appreciated that a distributed-feedback dye laser made according to the present invention has a broad range of selectable angles of incidence of a pumping beam on the dye cell. It is thereby possible to produce laser beams having wavelengths within a selected broad range of wavelengths. Means are provided for fine tuning such a laser to obtain very specific lasing wavelengths. Further, laser beams produced by it are fully transmitted from the dye cell. It will be appreciated that variations may be made relative to the preferred embodiment described herein without varying from the scope and spirit of the invention.

For instance, a single impinging beam could be used with a single four-link adjustment assembly with a prism having a face used for reflecting part of the beam back onto itself at the dye cell interface. The invention can also be used in a dye laser not having a refractive-index matching prism at all, as is occasionally conventionally done. Further, the relative lengths of the links in the four-link assemblies may be varied to provide different changes in the angular orientation of the tuning mirror as it is translated along the path of a beam incident on the mirror. Additionally, prism 36 may be other than a 45°-45°-90° prism, which would be accommodated by changing the angles of guide rods 80, 80' and the links. From the above, it will be seen that the distributed-feedback dye laser of the invention has several features which represent improvements over the prior art. It is therefore intended that the invention be limited only by the following claims and their equivalent language.

What I claim is:

1. In a distributed-feedback dye laser having means for generating a pumping beam having an axis of propagation and extending along a path in a known direction and a dye cell having a region impingeable by said pumping beam for lasing, a pumping-beam controller comprising:

a mirror disposable in the path of a beam produced by said generating means, for reflecting an incident beam such that the reflected beam impinges a portion of the dye-cell region; and means for adjusting the position of said mirror along the incident pumping beam path and for varying the annular orientation of said mirror relative to the incident beam path such that said mirror directs the resulting reflected beam toward the dye-cell region in a manner impinging substantially the same portion of the region for the positions of adjustment of said mirror along the path.

2. The controller of claim 1 wherein said adjusting means varies the angular orientation of said mirror relative to the incident beam path with adjustment of said mirror along the path.

3. The controller of claim 1 wherein said, adjusting means includes means for changing the angular orientation of said mirror, as it is translated along the beam path, to retain equality between an angle made by a straight line extending normal to the mirror face from the point of incidence of the axis of a beam incident on said mirror and the axis of the incident beam and the angle between the same line extending normal to said mirror face from the point of incidence of an incident beam axis and a straight line extending from the same point of incidence to said predetermined point.

4. The controller of claim 3 wherein said changing means includes first, second, third and fourth links pivotally interconnected in an equilateral-parallelogram configuration, said first link being held parallel to the incident beam path, said second link being connected to said first link and mounted to be held parallel to a straight line extending from the point of incidence on said mirror of the axis of an incident beam to the predetermined point, and said mirror is pivotally mounted relative to said first and second links.

5. The controller of claim 4 wherein the axis of pivoting between said first and second links is coincident with the mirror face.

6. The controller of claim 4 wherein said changing means further includes a guide link mounted both to said mirror and to the junction between said third and fourth links in a manner maintaining orientation of said mirror face normal to a straight line extending from the first and second link junction to the third and fourth link junction.

7. The controller of claim 1 which further includes a prism disposable on the dye cell adjacent the impinging region and means for providing a substantially non-reflective interface between said prism and the dye cell, said prism having a generally planar face disposed to be impinged by a beam reflected by said mirror, wherein the impinging region includes a target point where the axis of a beam reflected from said mirror intersects the region, and wherein the predetermined point is disposed on a straight line extending generally perpendicularly to said face and through the target point.

8. The controller of claim 7 wherein the predetermined point is disposed along the straight line extending perpendicularly to said prism face a distance x from said face, where $x = (n_m L \cos \alpha)/(n_p \cos \beta)$ and L is the distance along the straight line between said face and the target point, $\alpha$ and $\beta$ are the angles of incidence and refraction, respectively, of the beam at said face corresponding to a position of said mirror along the path of a beam incident on said mirror, and $n_m$ and $n_p$ are the indexes of refraction of the medium through which the beam incident on said prism face passes, and of said prism, respectively.

9. The controller of claim 1 wherein said adjusting means includes first, second, third and fourth links pivotally interconnected in a four-sided configuration, said first link being held parallel to the incident beam path, and said mirror is pivotally mounted relative to said first link.

10. The controller of claim 9 wherein said links are connected in a parallelogram configuration.

11. The controller of claim 10 wherein said second link is connected to said first link and said means for adjusting further includes a guide link fixedly mounted to said mirror and pivotally and slidingly mounted to the junction between said third and fourth links in a manner maintaining orientation of said mirror face relative to a straight line extending from the first and second link junction to the third and fourth link junction.

12. In a distributed-feedback dye laser having means for generating a pumping beam having an axis of propagation and extending along a path in a known direction and a dye cell having a region impingeable by said pumping beam for lasing, a pumping-beam controller comprising:

beam-splitting means disposable in the path of a beam produced by said generating means, for splitting such a beam into two split beams, each having an axis of propagation along a path in a known direction different from that of the other split beam;

first mirror means disposed in each of the two split beam paths for reflecting an incident split beam such that the two reflected split beams impinge a common portion of the dye-cell region; and means for adjusting the positions of each of said first mirror means along the respective incident split-beam paths and for varying the angular orientation of each of said first mirror means relative to the split-beam path such that said first mirror means direct the respective split beams reflected from said mirrors toward the dye-cell region in a manner impinging substantially the same portion of the region for the positions of adjustment of said mirrors along the incident split-beam paths.

13. The controller of claim 12 wherein said first mirror means are positioned to make each axis of the respective reflected split beams contain a predetermined point.

14. The controller of claim 13 wherein said adjusting means simultaneously adjusts said two first mirror means.

15. The controller of claim 14 wherein said adjusting means includes means mounted to each of said respective first mirror means for changing the angular orientation of each mirror, as it is translated along the respective split-beam path, to retain equality between an angle made by a straight line extending normal to the mirror face from the point of incidence of the axis of a split beam incident on said mirror and the axis of the incident split beam and the angle between the same line extending normal to said mirror face and a straight line extending from the same point of incidence to said respective predetermined point.

16. The controller of claim 15 wherein said changing means includes, for each of said first mirror means, first, second, third and fourth links pivotally interconnected in an equilateral-parallelogram configuration, said first link being held parallel to the incident split-beam path, said second link being connected to said first link and mounted to be held parallel to a straight line extending from the point of incidence on said first mirror means of the axis of an incident beam to the predetermined point, and each of said first mirror means is pivotally mounted relative to said first and second links.

17. The controller of claim 16 wherein the axis of pivoting between said respective first and second links is coincident with the respective mirror face.

18. The controller of claim 17 wherein said changing means further includes a guide link fixedly mounted to each of the corresponding first mirror means and pivotally and slidingly mounted to the junction between said third and fourth links in a manner maintaining orientation of said first mirror means face perpendicular to a straight line extending from the first and second link junction to the third and fourth link junction.

19. The controller of claim 13 which further includes a prism disposable on the dye cell adjacent the impinging region and means for providing a substantially nonreflective interface between said prism and the dye cell, said prism having first and second faces, each disposed to be impinged by a beam reflected from a corresponding one of said first mirror means and wherein the axes of said split beams reflected from said first mirror means intersect at a target point substantially coincident with the point of intersection of straight lines extending through the predetermined points and perpendicularly to the corresponding impinged faces of said prism, for a position of each of said first mirror means along the respective paths of beams incident on said first mirror means.

20. The controller of claim 19 wherein each of the predetermined points are disposed along the straight lines extending perpendicularly to said prism faces a distance x from the corresponding face, where $x = (n_m L \cos \alpha)/(n_p \cos \beta)$ and L is the distance along the straight line between said face and the target point, $\alpha$ and $\beta$ are the angles of incidence and refraction, respectively, of the beam at said face corresponding to a position of said corresponding first mirror means along the path of a beam incident on said first mirror means, and $n_m$ and $n_p$ are the indexes of refraction of the medium through which the beam incident on said prism face passes, and of said prism, respectively.

21. The controller of claim 13 wherein one of the split beam paths has disposed in it, between said beam-splitter means and the dye-cell impinging region, means for varying the direction of the corresponding split-beam path, and thereby for diverting the axis of propagation of a split beam reflected from the associated first mirror means from a direction toward the predetermined point.

22. The controller of claim 21 wherein said means for varying includes a solid prism and means for changing the angular orientation of said solid prism relative to the split beam path.

23. The controller of claim 13 wherein said beam-splitter means is of a type which transmits a portion of the beam through it and reflects the remaining portion to form the two split beams, said controller further having additional mirror means for directing the split beams to said corresponding first mirror means in such a manner that one split beam, between the means for generating a pumping beam and the dye-cell impinging region, is reflected a number of times which differs from the number of times the other split beam is reflected, by an even number.

24. The controller of claim 23 wherein both split beams are reflected the same number of times.

25. The controller of claim 24 wherein both split beams travel paths of generally equal lengths.

26. A distributed feedback dye laser comprising:
means for generating a pumping beam having an axis of propagation and extending along a path in a known direction,
a dye cell having a region impinged by the pumping beam for generating a laser beam extending along a laser axis in a predetermined direction and having a predominant polarization generally parallel with a predetermined plane, said cell including a container having surfaces which the laser beam impinges, at least one of said impinged surfaces being disposed generally in a plane intersecting perpendicularly said predetermined plane and disposed to make an angle of incidence of the laser beam on said surface oblique;
a mirror disposed in the path of a pumping beam produced by said generating means, for reflecting an incident beam such that the reflected beam impinges at least a portion of the dye cell region; and
means for adjusting the position of said mirror along the incident pumping beam path and for varying the angular orientation of said mirror relative to the incident beam path such that said mirror directs the resulting reflected beam toward the dye cell region in a manner impinging substantially the same portion of the region for the positions of adjustment of said mirror along the path.

27. The laser of claim 26 wherein the angle of incidence of the laser beam on at least one of said impinged surfaces is Brewster's angle.

28. The laser of claim 27 wherein said impinged dye-cell region is generally planar and said predetermined plane of laser beam polarization is generally parallel with the plane of the dye-cell region.

* * * * *